(12) United States Patent
Partanen et al.

(10) Patent No.: US 6,426,840 B1
(45) Date of Patent: Jul. 30, 2002

(54) ELECTRONIC SPOT LIGHT CONTROL

(75) Inventors: Jouni P. Partanen, Santa Monica; Nansheng Tang; Xingkun Wu, both of Valencia, all of CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/791,346

(22) Filed: Feb. 23, 2001

(51) Int. Cl.$^7$ .................. G02B 7/02; G02B 13/08; G02B 23/00; G02B 26/00
(52) U.S. Cl. .................. 359/823; 359/668; 359/290; 359/433
(58) Field of Search .................. 359/668, 689, 359/670, 671, 822, 823, 621, 619, 710, 290, 298, 223, 268, 399, 433, 293; 204/157.61

(56) References Cited

U.S. PATENT DOCUMENTS

| | | | |
|---|---|---|---|
| 4,575,330 A | 3/1986 | Hull | 425/174.4 |
| 5,058,988 A | 10/1991 | Spence | 356/121 |
| 5,059,021 A | 10/1991 | Spence et al. | 356/121 |
| 5,104,592 A | 4/1992 | Hull et al. | 264/22 |
| 5,123,734 A | 6/1992 | Spence et al. | 356/121 |
| 5,133,987 A | 7/1992 | Spence et al. | 356/121 |
| 5,182,056 A | 1/1993 | Spence et al. | 264/22 |
| 5,184,307 A | 2/1993 | Hull et al. | 364/474.24 |
| 5,193,024 A * | 3/1993 | Lawton et al. | 359/253 |
| 5,321,622 A | 6/1994 | Snead et al. | 364/474.24 |
| 5,633,761 A * | 5/1997 | Takashima et al. | 359/811 |
| 5,745,296 A * | 4/1998 | Nakamura et al. | 359/641 |
| 5,965,079 A | 10/1999 | Manners | 264/401 |
| 5,999,184 A | 12/1999 | Smalley et al. | 345/419 |
| 6,043,843 A * | 3/2000 | Kelly et al. | 348/355 |
| 6,129,884 A | 10/2000 | Beers et al. | 264/401 |
| 6,172,996 B1 | 1/2001 | Partenan et al. | 372/22 |
| 6,222,679 B1 * | 4/2001 | Nevis | 359/641 |
| 6,325,961 B1 * | 12/2001 | Beers et al. | 264/401 |

* cited by examiner

*Primary Examiner*—Georgia Epps
*Assistant Examiner*—Saeed Seyrah
(74) *Attorney, Agent, or Firm*—William H. Wright; Ralph D'Alessandro

(57) ABSTRACT

An illumination system includes optics capable of adjusting the size of a beam of light and adjusting the focus of the beam of light. Spot size control optics adjusts the overall size of the beam of light and separately adjusts the ellipticity of the beam, primarily in one dimension. Light from the spot size control optics passes to focus control optics that control the overall focus of the beam of light and adjust the astigmatism of the beam by altering the focus position of the beam of light in one dimension. The laser system, the spot size control optics and the focus control optics are within an enclosure. Actuators under remote control from outside of the enclosure adjust both of the spot size control optics and focus control optics in the thermal environment of the illumination system.

61 Claims, 4 Drawing Sheets

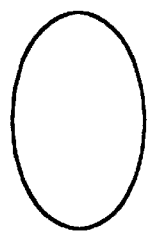
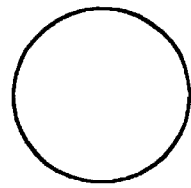
FIG. 2              FIG. 3
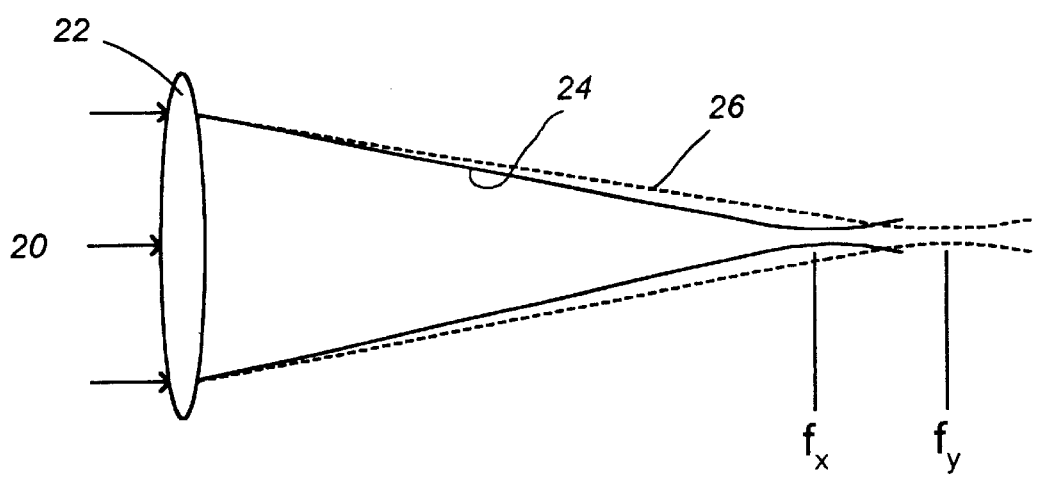
FIG. 4

ELECTRONIC SPOT LIGHT CONTROL

BACKGROUND OF THE INVENTION

1. Field of the Invention

The present invention relates to beam conditioning in illumination systems and particularly to beam conditioning systems for use in stereolithography systems.

2. Discussion of the Related Art

In recent years, rapid prototyping and manufacturing (RP&M) techniques have been developed for industrial use in the fast production of three-dimensional models. In general, RP&M techniques build a three-dimensional object, layer-by-layer, from a working material utilizing a sliced data set representing cross-sections of the object to be formed. Typically an object representation is initially provided by a computer aided design (CAD) system and the representation is translated into a number of sliced data sets that are then transferred to the successive layers of the working material.

Stereolithography, the presently dominant RP&M technique, may be defined as a technique for automated fabrication of three-dimensional objects from a fluid-like material utilizing selective solidification of thin layers of the material at a working surface to form and adhere successive layers of the object (i.e., laminae). In stereolithography, data representing the three-dimensional object are input as, or converted into, two dimensional layer data representing cross-sections of the object to be formed. Thin layers of material are successively formed and selectively transformed (i.e., cured) into successive laminae according to the two-dimensional layer data. During transformation the successive laminae are bonded to previously formed laminae to allow integral formation of the three-dimensional object.

A preferred material used in a stereolithographic apparatus (SLA) is a liquid photopolymer resin. Typical resins are solidified by exposure to selected wavelengths of electromagnetic radiation (e.g. selected wavelengths of ultraviolet (UV) radiation or visible light). This radiation of selected wavelength may be termed "solidifying radiation." The electromagnetic radiation is typically in the form of a laser beam that is directed to a target surface of the resin by two computer controlled scanning mirrors that scan the target surface along orthogonal directions. The scanning speed, pulse repetition frequency and spot size of the beam on the liquid surface are controlled to provide a desired exposure, depth of cure and solidification characteristics.

A more detailed description of stereolithography and the methods and apparatus for practicing photolithography are found in the following patents, which are hereby incorporated by reference:

U.S. Pat. No. 4,575,330 to Hull: Describes the fundamentals of stereolithography.

U.S. Pat. No. 5,058,988 to Spence, et al.: Describes the use of beam profiling techniques in stereolithography.

U.S. Pat. No. 5,059,021 to Spence, et al.: Describes the use of scanning system drift correction techniques for maintaining registration of exposure positions on the target surface.

U.S. Pat. No. 5,104,592 to Hull et al.: Describes the use of various scanning techniques for reducing curl-type distortion in objects that are being formed stereolithographically.

U.S. Pat. No. 5,123,734 to Spence, et al.: Describes a technique for calibrating a scanning system on a stereolithographic apparatus.

U.S. Pat. No. 5,133,987 to Spence, et al.: Describes the use of a large stationary mirror in the beam path between the scanning mirrors and a target surface.

U.S. Pat. No. 5,182,056 to Spence, et al.: Describes the simultaneous use of multiple wavelengths to expose the resin.

U.S. Pat. No. 5,184,307 to Hull, et al.: Describes the use of slicing techniques for converting three-dimensional CAD data into cross-sectional data for use in exposing the target surface to appropriate stimulation.

U.S. Pat. No. 5,321,622 to Snead, et al.: Describes the use of Boolean operations in deriving cross-sectional data from three-dimensional object data U.S. Pat. No. 5,965,079, to Gigl, et al.: Describes various scanning techniques for use in stereolithography.

U.S. Pat. No. 5,999,184, to Smalley, et al.: Describes the use of solidification techniques to simultaneously cure multiple layers.

U.S. Pat. No. 6,129,884 to Beers, et al.: Describes the control of a pulsed illumination source to achieve desired solidification characteristics.

Commercially available photopolymer for use in stereolithography are typically of acrylate, epoxy or combined chemistry. Typically, resins contain a plurality of components. These components may include one or more photoinitiators, monomers, oligomers, inert absorbers, and other additives. The usefulness of resins for stereolithography is in part determined by the photospeed of the resin and the ability of the resin to form adequately cohesive laminae of appropriate thickness. It is desired that the photospeed be high enough to enable rapid solidification of cross-sections with available power levels of solidifying radiation. Further, since the depth of polymerization in the resin is linked to the locations at which photons are absorbed, absorption of photons by the resin should be sufficient to form adequately thin layers. Examples of preferred photopolymers include, but are not limited to, SL 7540, SL 7520, SL 7510, SL 5530, SL 5520, SL 5510 and SL 5195 (manufactured by Vantico, Inc. and as sold by 3D Systems, Inc. of Valencia, Calif.), SOMOS 9120, 9100, 8120, 8100, 7120 and 7120 (manufactured by DSM Somos of New Castle, Del.).

Photoinitiators are the component of the resin that determines the photosensitivity of the resin at a given wavelength. Radiation absorption by the photoinitiator leads to chemical changes in the photoinitiator that can cause polymerization of the monomers and oligomers. Thus, radiation of appropriate wavelengths to be absorbed by the photoinitiator is known as solidifying radiation. The monomers/oligomers can absorb certain wavelengths of electromagnetic radiation. As absorption by the monomers/oligomers typically does not yield an efficient polymerization reaction, absorption of solidifying radiation by the monomers/oligomers is typically undesired. Thus, the most effective wavelengths for use in stereolithography are those strongly absorbed by the photoinitiator (high coefficient of absorption) and only weakly absorbed by the monomers and oligomers (low coefficient of absorption). Examples of preferred photoinitiators include, but are no limited to, triarylsulfonium salts, mixtures of triarylsulfonium salts with phosphate salts or antimonate salts; 2,2-dimethoxy-2-phenyl acetophenone (BDK) $C_{16}H_{16}O_{16}$; 2,4,6-trimethyl benzoyl diphenyl phosphine oxide (TPO); an 1-hydroxycyclohexyl phenyl ketone (HCPK) $C_{13}H_{16}O_2$.

The useable wavelength range is bounded at the low wavelength end by monomer/oligomer absorption properties and at the upper wavelength end by photoinitiator absorption. As such, the reactive (i.e., actinic) spectral sensitivity of a photopolymer resin may be described as the product of the photoinitiator absorption spectrum and the monomer/oligomer transmission spectrum, as shown in FIG. 1. Note that th FIG. 1 illustration is for a particular photopolymer system. Other systems exist and will have different curves, providing different optimal illumination sources. FIG. 1 depicts plots of photoinitiator absorption 11, monomer/oligomer transmission 13, and reactive sensitivity or reactive response 15 of the resin. The absorption and transmission coefficients not only depend on the specific chemical composition of each component, but also on the concentrations of each component within the resin. The absorption by the monomer/oligomer, which depends upon the wavelength of radiation, affects the activation of the photopolymers because the monomer/oligomer absorption sometimes competes with the photoinitiator absorption. Consequently, shifts in wavelength for peak reactive response may result due to changes in either composition or concentration. For a given resin composition this peak can be readily determined by one of skill in the art. Those of ordinary skill appreciate that different light sources require use of different resin compositions.

In the example of FIG. 1, the peak reactive response occurs within a range of about 328 nm–337 nm and the half-maximum response falls within the range of about 320 nm to about 345 nm. As such, in this example electromagnetic radiation within the range of 320 to 345 nm is preferred and electromagnetic radiation within the range of 328 to 337 nm is even more preferred. The more preferred range include the wavelengths within 10% of the peak reactive response. The preferred range includes wavelengths within 50% of the peak reactive response. For different resin systems and response curves, different preferred ranges can be established in the same manner.

Until recently, commercial stereolithography systems used helium-cadmium (HeCd) lasers that emit radiation a 325 nm or argon-ion lasers that emit radiation primarily at 351 nm. Helium-cadmium lasers have a wavelength, input power and output that are suitable and acceptable for stereolithography. The output power from HeCd lasers is undesirably limited and unsuitable for building large objects or when faster build speeds are needed. Thus, although HeCd lasers are useful in stereolithography, they do not achieve all of the needs of stereolithography.

Argon-ion lasers have output power levels and output modes suitable for faster part building and/or larger stereolithography parts. On the other hand, the input power is excessive, and necessitate water-cooling.

Present diode pumped solid state (DPSS) lasers have both input and output powers suitable for stereolithography. These solid state lasers are pulsed where the prior gas lasers (e.g., HeCd nd Ar$^+$) provide a continuous wave (CW) laser beam. To effectively utilize these solid state lasers a sufficiently high pulse repetition rate is needed to ensure that continuous cured lines of photopolymer are formed.

Recent commercial stereolithographic systems have employed pulsed solid state lasers to selectively solidify the material. These commercial systems frequency triple the 1064 nm fundamental infrared radiation of Nd:YVO$_4$ pulsed solid state lasers to generate ultraviolet output light. Frequency tripling generates an output wavelength of 355 nm. Resins appropriate to use with 355 nm light sources are known and commercially available.

SUMMARY OF THE PREFERRED EMBODIMENTS

An aspect of the present invention provides an optical system including spot size control optics and focus control optics. The spot size control optics receives a beam of light, adjusts a lateral extent of the beam of light and outputs the beam of light. The beam of light has an extent in a first lateral direction and a second lateral direction perpendicular to the first lateral direction. The spot size control optics are coupled to an actuator responsive to electrical signals to adjust an ellipticity of the beam, wherein movement of the actuator alters the first lateral extent of the beam of light more than the second lateral extent. The focus control optics receives the beam of light, alters a position of a focus of the beam of light and outputs the beam of light.

Another aspect of the present invention provides an optical system including spot size control optics and focus control optics. The spot size control optics receive a beam of light, adjust a lateral extent of the beam of light and output the beam of light. The system includes focus control optics coupled to an actuator responsive to electrical signals. The focus control optics receives the beam of light, alters a position of a focus of the beam of light and outputs the beam of light. The beam of light has a first focus position for a first lateral component of the beam of light and has a second focus position for a second lateral component of the beam of light. The first lateral component is selected to be perpendicular to the second lateral component. The focus control optics adjusts the first focus position to a greater extent than the second focus position in response to the electrical signals supplied to the actuator.

Still another aspect of the present invention provides an optical system including spot size control optics and focus control optics. The spot size control optics receives a beam of light, adjusts a lateral extent of the beam of light and outputs the beam of light. The beam of light has an extent in a first lateral direction and a second lateral direction perpendicular to the first lateral direction. The spot size control optics are coupled to a spot size actuator responsive to electrical signals to adjust an ellipticity of the beam, wherein movement of the spot size actuator alters the first lateral extent of the beam of light more than the second lateral extent. The system includes focus control optics coupled to a focus actuator responsive to electrical signals. The focus control optics receives the beam of light, alters a position of a focus of the beam of light and outputs the beam of light. The beam of light has a first focus position for a first lateral component of the beam of light and has a second focus position for a second lateral component of the beam of light. The first lateral component is selected to be perpendicular to the second lateral component. The focus control optics adjust the first focus position to a greater extent than the second focus position in response to the electrical signals supplied to the focus actuator.

Yet another aspect of the present invention provides an optical system including a laser system, spot size control optics, focus control optics and beam positioning optics. The laser system includes a solid state laser and outputs a beam of light to the spot size control optics, which adjusts the lateral extent of the beam of light and outputs the beam of light. The spot size control optics include a first lens mounted on a pivot and a linear translation stage. A first actuator is coupled to rotate the first lens on the pivot and a second actuator is coupled to translate the lens along the linear translation stage. The first and second actuators are responsive to electrical signals. The focus control optics receive the beam of light adjusted by the spot size control optics, alters a position of a focus of the beam of light and outputs the beam of light. Beam positioning optics receive the beam of light altered by the focus control optics and laterally position the beam of light.

Another aspect of the invention provide an optical system having a laser system outputting a beam of light to spot size control optics that receives the beam of light, adjusts a lateral extent of the beam of light and outputs the beam of light. Focus control optics receives the beam of light adjusted by the spot size control optics, alters a position of a focus of the beam of light and outputs the beam of light. The focus control optics include a first lens mounted on a pivot and a linear translation stage, a first actuator coupled to rotate the first lens on the pivot and a second actuator coupled to translate the first lens along the linear translation stage. The first and second actuators are responsive to electrical signals. Beam positioning optics receives the beam of light altered by the focus control optics and laterally position the beam of light.

BRIEF DESCRIPTION OF THE DRAWINGS

The invention may be better understood from the following description with reference to the drawings, which form part of this disclosure.

FIG. 2 illustrates an elliptical beam cross section and

FIG. 3 illustrates a circular beam cross section.

FIG. 4 illustrates astigmatic beam focusing characteristics of certain solid state laser systems.

DETAILED DESCRIPTION OF THE PREFERRED EMBODIMENTS

Figure 1:
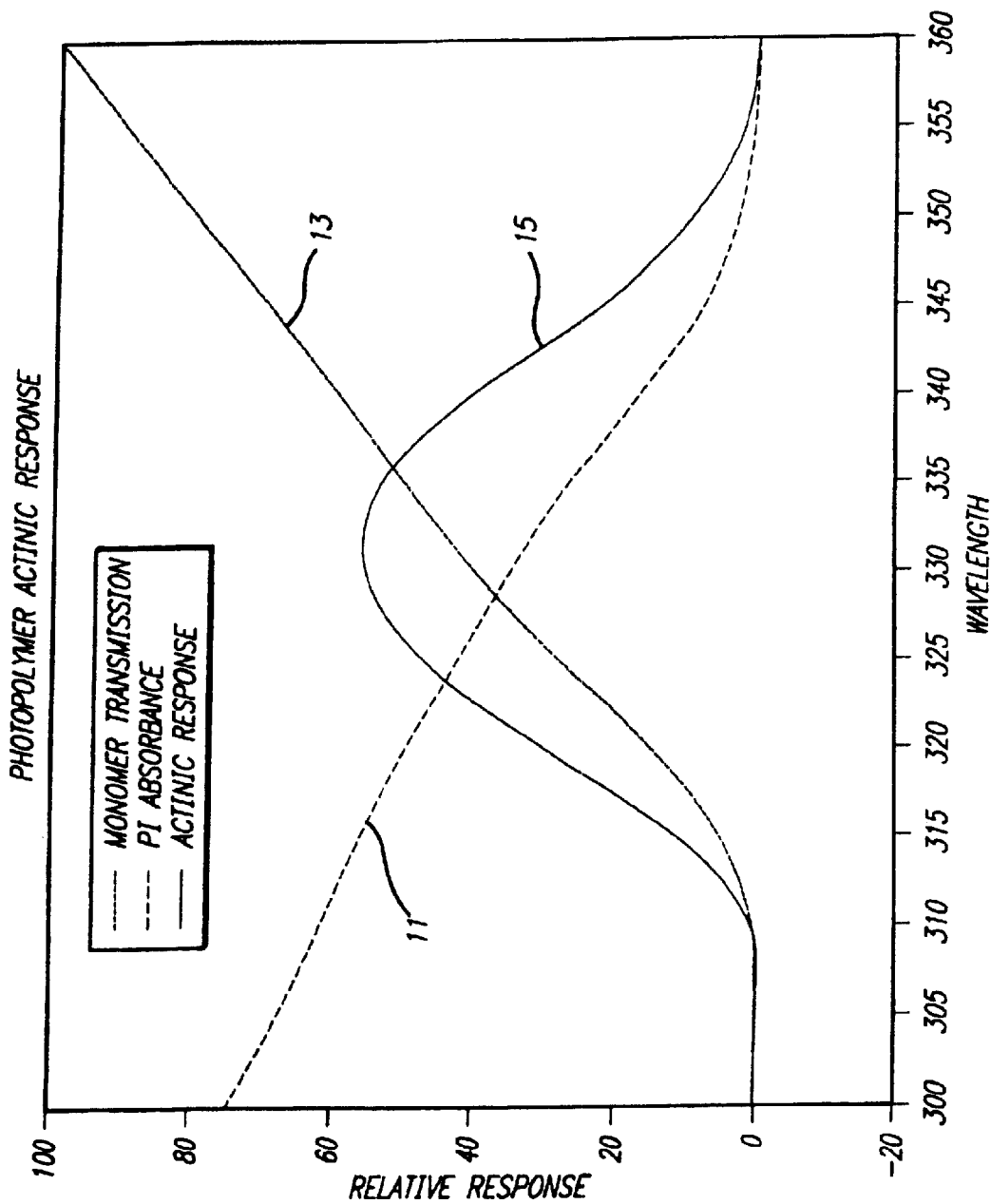
FIG. 1 illustrates certain of the optical properties of an exemplary set of stereolithography materials.

Preferred embodiments of the present invention provide an illumination system appropriate for use in stereolithography. Preferred implementations of this illumination system provide a high quality beam of light for exposing the material used in stereolithography. Moreover, the illumination system is easier to set up within the stereolithography apparatus and allows easier adjustments to optimize the characteristics of the illumination system within the stereolithography apparatus.

The use of solid state lasers in stereolithography systems provides greater levels of illumination and, at least theoretically, should provide systems that are easier to set up and maintain. This possibility has not been obtained in its entirety. Some of the difficulties of stereolithography systems using solid state lasers are addressed by utilizing more robust, efficient and longer life laser systems such as that illustrated in U.S. Pat. No. 6,157,663 to Wu, et al. The Wu patent describes a light source including a frequency tripled Nd:YVO$_4$ solid state laser and is hereby incorporated by reference as a preferred component of an illumination system in accordance with the present invention. Even though the laser system the Wu patent discloses is well optimized, the beam output by that laser requires beam conditioning to be used for stereolithography. The following two patents describe aspects of the implementation of solid state lasers in stereolithography apparatus, including certain aspects of beam conditioning, and are hereby incorporated by reference:

U.S. Pat. No. 6,129,884 to Beers, et al.: Describes the control of a pulsed illumination source to achieved desired solidification characteristics.

U.S. Pat. No. 6,172,996 to Partenen, et al.: Describes the use of a frequency multiplied solid state laser a a light source for stereolithography.

Part of the beam conditioning to be performed on the Wu patent's laser is conventional and relates to the fact that the size of the beam produced by a laser generally needs to be adjusted for use in a stereolithography system. Adjusting the spot size of a laser beam is described in U.S. Pat. No. 6,129,884 to Beers, et al., identified and incorporated by reference above. The Beers patent describes a system in which the spot size of a laser beam is altered by changing the focus position of the beam. While this strategy alters a beam's spot size, it is undesirable because the focus plane of the beam is removed from the target surface so that the beam spot size changes significantly for even small changes in the spacing between the beam and the target surface. It is difficult to reliably expose material in this state. Preferred aspects of the present invention alter the spot size while maintaining the focus of the beam near the target surface.

A second type of beam conditioning for stereolithography adjusts the focus position of the output of the illumination system provided to the surface of the stereolithography material. A focusing module is described in the Beers patent but, as discussed above, that module is used for changing the spot size and does not provide an independent, automatic control of focus position. Conventional illumination systems provide manual focus adjustment that is fixed during assembly of the illumination system. These forms of beam conditioning can be adequate but are not fully optimal for the frequency tripled solid state laser of the Wu patent. For example, most illumination systems like those described in the Beers patent are adjusted with respect to focus with the system's enclosure off of the system. When the enclosure is placed around the light source and its associated optics, the thermal environment for the optics changes and the characteristics of the optics change to an undesirable extent.

The beam of light output by the frequency tripled, Nd:YVO$_4$ laser of the Wu patent generally is asymmetric in that th beam is elliptical in cross section and astigmatic in that different axes of the laser beam focus at different distances. Asymmetry is illustrated schematically in FIG. 2, which shows the 1/e$^2$ level of the intensity for a cross section of an output of the frequency tripled solid state laser, where the cross sectional plane is perpendicular to the propagation path of the laser. In many instances, the level of ellipticity of the laser's output beam can be controlled but the output of typical solid state laser systems generally is elliptical. For most stereolithography systems, it is preferable for an illumination system to provide as an output a beam having a more ideal cross section like the circular cross section illustrated in FIG. 3. This generally requires additional beam conditioning for the Wu patent's laser.

Astigmatism is illustrated in FIG. 4, which shows schematically the output beam 20 of a solid state laser system focused by an ideal lens 22. FIG. 4 illustrates the focussing behavior of the beam along perpendicular x and y planes within the beam of the laser, with the x and y axis beam profiles rotated to show them overlapping on the figure. The focusing behavior of the beam along an x axis plane is indicated by the solid line 24, with a focus position or beam waist at $f_x$. The focusing behavior of the beam along a y axis plane is indicated by the dashed line 26 with a focus position or beam waist at $f_y$. As illustrated, the beam does not uniformly focus a single plane. This astigmatism undesirably reduces the quality of the beam at a focus position.

The asymmetric and astigmatic beam imperfections discussed above reduce the quality of the beam used for stereolithography and so are preferably accommodated through beam conditioning in preferred implementations of an illumination system.

A preferred implementation of an illumination system includes optics to adjust the spot size of a beam of light and to adjust the focus of the beam of light. Preferably, the optics adjust the overall spot size of the beam and substantially independently adjust the spot size of the beam along one axis across the beam. Preferably, the optics adjust the overall focus position of the beam and also substantially independently adjusts the focus position of the beam across one axis of the beam. Under this referred configuration, the illumination system not only adjusts the size of beam of light but can also remove certain asymmetry and astigmatism from the beam of light.

The term "substantially independently" refers to the fact that many optical elements do not allow entirely independent adjustments along perpendicular axes across the beam spot. For example, a circular lens can be tilted to affect the optical power to a greatest extent along a plane through an x axis. Such a tilting inevitably changes the lens's optical power along a plane through the y axis, but to a smaller extent. As a practical matter, preferred beam conditioning systems provide one adjustment along an axis perpendicular to the propagation path to alter the ellipticity or astigmatism of the beam and another adjustment to alter the overall spot size or overall focus position. Because an adjustment along one axis generally alters another axis of the beam, it is typically necessary to perform iterations of the spot size and focus position adjustments to achieve a desired focus position and spot size, at least in initial set up.

An implementation of the illumination system may include one set of optics for adjusting the spot size of the beam produced by the illumination system and a second set of optics for adjusting a focus position of that beam. The spot size adjusting optics may include a lens mounted on a pivot controlled by an actuator to move the lens about the pivot axis and thereby change the optical characteristics of the lens experience by the beam passing through the lens along its predetermined optical path. That spot size adjustment lens may also be mounted on a translation stage controlled by an actuator to translate the lens along a propagation path of the beam of light. The translation stage is typically a linear translation stage aligned parallel to the local propagation path of the beam and can be used to adjust the overall size of the spot of the beam as measured along perpendicular axes in a plane perpendicular to the local propagation path. As a practical matter, the spot size of the beam that is significant to the performance of the illumination system is at or near the focal plane of the output from the illumination system. Thus, when this discussion refers to making a spot larger or smaller, it is with reference to the size of the spot near the focal plane of the illumination system. Those of ordinary skill will recognize that making a beam spot large may, in many instances, be accomplished by reducing the spot size at a different part of the illumination system, depending of course on the particular configuration of the optical system.

The focus adjusting optics may similarly include a lens mounted on a pivot controlled by an actuator to move the lens about the pivot axis and thereby change the focusing characteristics the lens experienced by the beam passing through the lens along its predetermined optical path. A tilted lens, that is a lens tilted from a plane perpendicular to the propagation path of a beam, has asymmetric focusing qualities. That focus adjusting lens may also be mounted on a translation stage controlled by an actuator to translate the lens along a propagation path of the beam of light. The translation stage is typically a linear translation stage aligned parallel to the local propagation of the beam and, when translated, adjusts the overall focus position of the beam.

Preferred implementations of the illumination system provide two degrees of freedom in the spot size adjusting optics an two degrees of freedom in the focus adjusting optics. This may be accomplished with a single, simple lens for spot size adjustment and a single, simple lens for focus control adjustment, where each of these lenses can be moved in a controlled manner in two at least partially independent directions. Here, the independent directions consist of a linear translation and a rotation. Other combinations of optical elements and movements of those lenses can accomplish the same results. The desired level of adjustment is accomplished in the illustrate system using two lenses. Such a system is desirable for its simplicity and compactness. On the other hand, four lenses each with a single degree of freedom can easily accomplish what is accomplished with two lenses each with two degrees of freedom.

Because rotation of a lens typically only reduces the effective focal length of the lens, the choice between vertical and horizontal axis of rotation for each of the lenses depends on the particular properties of the beam and has to be determined, for example, using appropriate optical ray tracing programs like PARAXIA. Preferably, the beam conditioning system for the illumination system is designed by first analyzing the beam generated by the light source, such as a solid state laser, and tracing the beam train to understand where and how the optical power of different optical elements needs to be adjusted.

The term beam used here is intended to be general. The term spot size generally refers to a dimension measured laterally across the cross section of a beam, substantially in a plane perpendicular to the propagation direction of the beam. The beams described here have Gaussian intensity distributions in cross section and so the term spot size is generally defined by threshold level within that distribution. Other beam shapes are known and possible. In some instances, the threshold may be defined as the $1/e^2$ level on the distribution although other conventions may be applicable. In addition, those of ordinary skill in the art will appreciate that the spot size adjusting optics and the focus adjusting optics are not, by themselves, determinative of either of the spot size or the focus position. Typical systems include additional optical elements and each of those elements might affect the ultimate spot size and the focus position of the beam.

An advantage of particularly preferred implementations of the illumination system is that the spot size adjustments and the focus adjustments are made remotely using electrical signals. Thus, the final adjustments to the illumination system can made with the laser, beam positioning optics and other optical systems within the thermal environment in which the system is intended to operate. For example, the laser and the beam conditioning optics are within a single enclosure. Since the laser is a significant heat source and the beam focus is at a considerable distance from the output of the illumination system (on the order of 700 mm in some contemplated systems), it is important to establish a constant thermal environment. Adjustments to the beam conditioning optics are made with the illumination system's enclosure closed. This significantly improves the predictability and reliability of the beam's intensity profile and focus. Moreover, both of the spot size and the focus of the beam can be altered during operation to accommodate different separations between the illumination system output and the surface of the stereolithography material.

Preferred implementations of the beam conditioning system also accommodate changes in the illumination system. There may be slow drifts in the characteristics of the optical elements and the optical elements may degrade over time. Such shifts and degradations can be detected by a beam profiler within the illumination system or predicted from experience and the illumination system can be adjusted to correct for these drifts or degradations.

Figure 5:
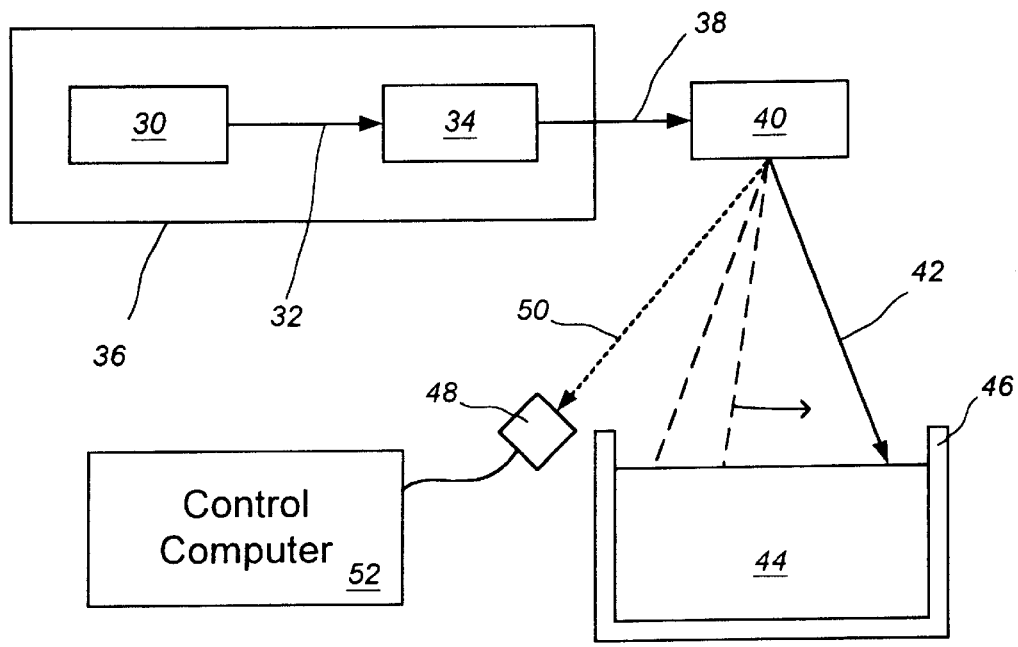
FIG. 5 schematically illustrates aspects of stereolithography apparatus according to aspects of the present invention.

FIG. 5 shows schematically a stereolithography apparatus. Light is initially generated by a solid state laser system 30 like that described in U.S. Pat. No. 6,157,663 to Wu, et al. More particularly, solid state laser system 30 includes a diode pumped laser utilizing a Nd:YVO$_4$ gain medium with a Q-switch within the cavity of the laser to provide pulsed output from the solid state laser. Solid state laser system 30 also includes a frequency doubling crystal and a frequency tripling crystal to provide a frequency tripled output beam 32 from the solid state laser system 30. The intensity of the output beam of the solid state laser system is preferably adjusted to a desired level by an acousto-optic modulator (AOM) in the optical path of the laser between the solid state laser and the doubling crystal. The beam 32 output by the laser system 30 is provided to beam conditioning optics 34. Both of the laser system 30 and the beam conditioning optics 34 are provided within an enclosure 36. The enclosure is primarily a safety and cleanliness feature and so has opaque walls to enclose the laser light, with an output port to pass the output beam 38 to other parts of the stereolithography apparatus.

The beam conditioning optics 34 adjust he beam's spot size and focus position and preferably performs other beam conditioning functions including reducing asymmetry and astigmatism in the beam. The beam conditioning optics are described in additional detail below. After beam conditioning, the beam of light 38 is passed out of the enclosure 36 to beam steering and scanning optics 40. The beam steering and scanning optics 40 include two computer controlled scanning mirrors for moving the output beam 42 in a controlled manner in an x-y plane on the material of the stereolithography system.

The stereolithography material 44 is held within a vat 46 and the beam scanning optics 40 move the beam 42 over the surface of the stereolithography material 44. Generally an object formed in the system is held on a platform submerged within the stereolithography material within the vat 46. Successive layers are formed on the surface of the medium and the object is submerged further into the vat by an elevator moving under control of a computer. The operation of the vat and the translation elevator are described and illustrated in various of the patents identified and incorporated by reference above.

The stereolithography apparatus also provides a beam profiler 48, such as that described in U.S. Pat. No. 5,058,988 to Spence, et al., identified and incorporated by reference above, which receives and characterizes the beam 50 positioned off of the vat 46. This beam profiler 48 operates under the control of and in cooperation with the computer 52. The other elements of the illumination system, including the laser system 30, the beam conditioning optics 34 and the beam steering optics 40 are also coupled to and controlled by the control computer 52. This allows the beam profiler 48 to be used in cooperation with the beam conditioning optic 34 to optimize the beam shape, focus and size for stereolithography. The optimization process can be facilitated by the control computer 52 or can be fully automated by the computer 52. In this manner, the illumination system can selectively produce one of two different spot sizes and adjusts the spot shape and the focus position automatically to optimize the beam for stereolithography.

Figure 6:
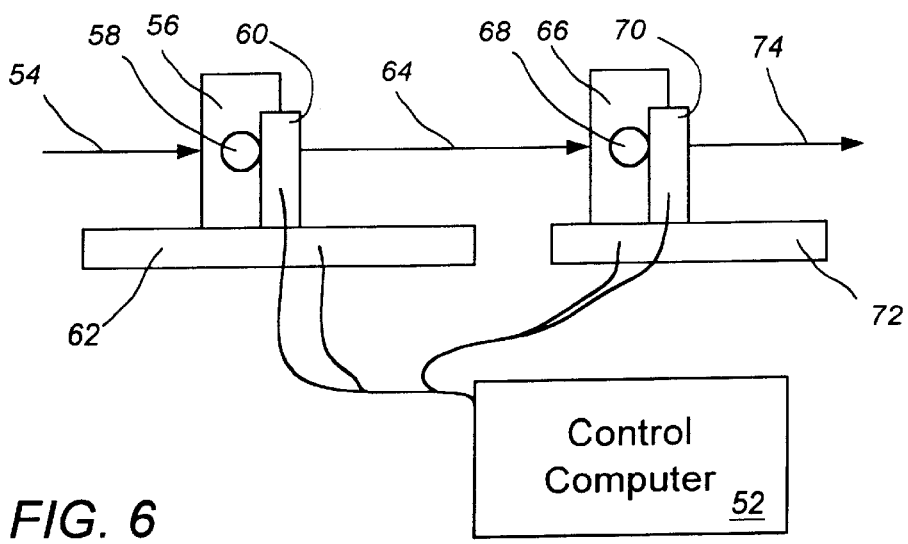
FIG. 6 illustrates in greater detail aspects of beam conditioning optics within the FIG. 5 stereolithography apparatus.

FIG. 6 shows a detail of the beam conditioning optics. A first lens mounted in a lens housing 56 receives the beam of light 54 within the beam conditioning optics. The lens housing 56 holds the lens in a pivot 58 controlled by an actuator 60 that rotates the mirror. The actuator 60 preferably includes a stepper operating under control of the computer 52 to precisely rotate the lens away from the normal to the propagation path of the beam of light. Rotating the lens away from that normal changes the focusing properties of the lens to cause the lens to adjust the ellipticity of the beam. This elliptical quality allows the lens to change the input beam spot shape to a more circular beam shape, as determined by the beam profiler. The assembly of the spot size adjusting optics with the pivoting housing is mounted on a linear translation stage 62, also operated by a stepper motor under computer control. Translation of stage 62 moves the spot size control lens linearly with respect to the propagation path and thereby changes the magnification of the beam spot by the overall optical system of the beam conditioning optics. The beam 64 output by the spot size adjusting optics preferably has some or all of its beam shape asymmetry removed.

The focus adjusting optics similarly includes a second lens mounted in a housing 66 on a pivot 68 controlled by an actuator 70. The actuator 70 includes a stepper motor operating under control of the computer 52 to precisely rotate the lens about the pivot axis and thereby change the focusing characteristics of the lens experienced by the beam passing through the lens along its propagation path. The tilted lens, that is a lens tilted from a plane perpendicular to the propagation path of a beam, has asymmetric focusing qualities that alter the astigmatism of the beam. That focus adjusting lens is mounted on a linear translation stage 72 controlled by an actuator to translate the lens along a propagation path of the beam of light. The translation stage is aligned parallel to the local propagation of the beam and, when translated, adjusts the overall focus position of the beam 74 output from this portion of the beam conditioning optics. The beam 74 output by the focus adjusting optics preferably has some or all of its focus a astigmatism removed.

Figure 7:
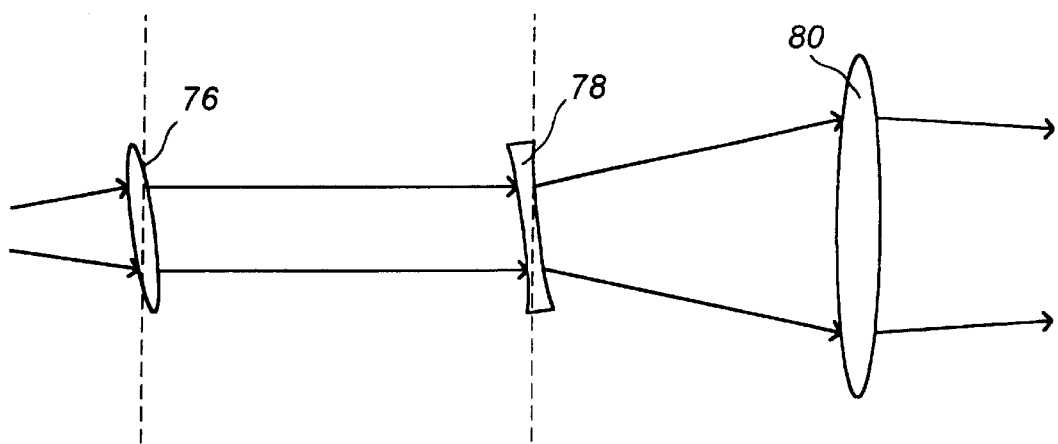
FIG. 7 shows another schematic view of the beam conditioning optics.

FIG. 7 shows, more schematically, a further assembly of the beam conditioning optics, including the rotatable spot size adjusting lens 76 and the rotatable focus adjusting lens 78. These correspond to the lens mounted within housings 56 and 66 respectively of FIG. 6. In the illustrated and presently preferred implementation, the spot size adjusting lens 76 is a positive lens and the focus adjusting lens 78 is a negative lens. As illustrated, these lenses can be tilted by an adjustable amount from the normal to the beam path to effect the desired adjustments to the beam. As discussed above, each of lenses 76 and 78 can also be translated linearly along the propagation path of the beam. In different optical systems, the functions of these lenses might be accomplished by different types of lenses and at least some of the functions of these lenses could be provided by a mirror or a mirror in combination with a mirror. Other suitable elements for the spot size adjusting optics and focus positioning optics include prisms and cylindrical lenses. For example, the adjustments discussed here can be accomplished using four cylindrical lenses aligned differently and linearly translated on translation stages.

In the FIG. 7 illustration of a beam positioning system, an additional focusing lens 80 is provided. All of the illustrated lenses cooperate to size the beam at the target focal plane of the illumination system. The focusing lens 80 is, in this illustrative example, the last focusing element of the beam conditioning optics. The focusing lens 80 cooperates with the other lenses 76 and 78 to position the focus position of the beam at the target focal plane of the illumination system. The precise selection of lenses, lens characteristics, spacing and other optical characteristics of the illustrated system will depend largely on the specific implementations thereof. Those of ordinary skill in the art can select and design optical systems such as this, and there are commercially available computer programs that further facilitate the design and layout process.

In the specific illustration of a beam conditioning system, the first lens 76 might have a focal length of about 100 mm and be positioned about 100 mm away from the tripler of the preferred solid state laser system. Thus, the first lens 76 is positioned to function somewhat similar to a collimating lens but primarily functions to establish the beam's spot size at the second lens 78. The second lens 78 is spaced about 300 mm from the first lens 76. As schematically illustrated, the second lens 78 is a negative lens and may have a focal length of −25 mm and be spaced 75 mm away from a third, positive lens 80 having a focal length of 100 mm. Second lens 78 and third lens 80 form a constant expansion beam expander. Light exiting the focusing lens 80 is focused slowly at a distance of about 700 mm from the focusing lens 80.

Although the present invention has been described in detail with reference only to the presently preferred embodiments, those of ordinary skill in the art will appreciate that various modifications can be made without departing from the invention. For example, while the above discussion is made in terms of beam conditioning for a solid state laser system, aspects of the described beam conditioning system are applicable to gas laser sources. As such, the present invention is not to be limited the particularly described preferred embodiments. Rather, the scope of the present invention is to be determined from the claims, which follow.

What is claimed:

1. An optical system, comprising:
    spot size control optics receiving a beam of light, adjusting a lateral extent of the beam of light and outputting the beam of light, the beam of light having a first extent in a first lateral direction and a second extent in a second lateral direction perpendicular to the first lateral direction, the spot size control optics coupled to an actuator and responsive to electrical signals to adjust an ellipticity of the beam, wherein movement of the actuator alters the first lateral extent of the beam of light more than the second lateral extent; and
    focus control optics receiving the beam of light, altering a position of a focus of the beam of light and outputting the beam of light.

2. The optical system of claim 1, further comprising an enclosure around the spot size control optics and the focus control optics, the enclosure having walls opaque to the beam of light and having at least an output port to output the beam of light.

3. The optical system of claim 2, wherein the spot size control optics are coupled to a second actuator responsive to electrical signals to adjust the first and second lateral extents of the beam of light substantially equally.

4. The optical system of claim 2, wherein the spot size control optics includes a second actuator responsive to electrical signals to adjust an overall spot size of the beam.

5. The optical system of claim 4, wherein the second actuator adjusts the overall spot size substantially independently of the ellipticity.

6. The optical system of claim 5, wherein the electrical signals selectively define a first state in which the beam of light has a first selectable lateral extent at a first beam location and a second state in which the beam of light has a second selectable lateral extent at the first beam location different from the first selectable lateral extent, the electrical signals automatically establishing the first state or the second state in response to control signals.

7. The optical system of claim 1, wherein the focus control optics comprise an actuator responsive to electrical signals to adjust an overall focus position of the beam of light.

8. The optical system of claim 7, wherein he electrical signals selectively define a first state in which the beam of light has a first selectable lateral extent at a first beam location and a second late in which the beam of light has a second selectable lateral extent at the first beam location different from the first selectable lateral extent, the electric signals automatically establishing either of the first state or the second state in response to control signals.

9. The optical system of claim 7, wherein the spot size control optics are coupled to a second actuator responsive to the electrical signals, the second actuator adjusting both of the first lateral extent and the second lateral extent of the beam of light.

10. The optical system of claim 9, wherein the electrical signals selectively define a first state in which the beam of light has a first selectable lateral extent at a first beam location and a second state in which the beam of light has a second selectable lateral extent at the first beam location different from the first selectable lateral extent, the electric signals automatically establishing either of the first state or the second state in response to control signals.

11. The optical system of claim 1, wherein the spot size control optics comprise a lens mounted on a pivot and a linear translation stage, a first actuator coupled to rotate the lens on the pivot and a second actuator coupled to translate the lens along the linear translation stage, the first and second actuator responsive to electrical signals.

12. The optical system of claim 11, wherein the lens is a positive lens and is positioned so that the beam passes through center of the lens.

13. The optical system of claim 11, wherein the electrical signals selectively define a first state in which the beam of light as a first selectable lateral extent at a first beam location and a second state in which the beam of light has a second selectable lateral extent at the state beam location different from the first selectable lateral extent, the electric signals automatically establishing either of the first state or the second state in response to control signals.

14. The optical system of claim 13, further comprising an enclosure around the spot size control optics, the first and second actuator and the focus control optics, the control signals generated outside the enclosure.

15. The optical system of claim 14, further comprising a solid state laser within the enclosure, the solid state laser out outputting the beam of light.

16. An optical system, comprising:
    spot size control optics receiving a beam of light, adjusting a lateral extent of the beam of light and outputting the beam of light; and
    focus control optics coupled to an actuator responsive to electrical signals, the focus control optics receiving the beam of light, altering a position of a focus of the beam of light and outputting the beam of light, the beam of light having a first focus position for a first lateral component of the beam of light and having a second focus position for a second lateral component of the beam of light, the first lateral component perpendicular to the second lateral component, the focus control optics adjusting the first focus position to a greater extent than the second focus position in response to the electrical signals supplied to the actuator.

17. The optical system of claim 16, further comprising an enclosure around the spot size control optics and the focus control optics, the enclosure having walls opaque to the beam of light and having at least an output port to output the beam of light.

18. The optical system of claim 17, wherein a lens within the actuator adjusts an astigmatism of the beam of light responsive to electrical signals to reduce a separation between the first focus position and the second focus position.

19. The optical system of claim 17, wherein the focus control optics are coupled to a second actuator responsive to electrical signals to adjust the first focus position of the beam of light and the second focus position of the beam of light simultaneously.

20. The optical system of claim 17, wherein the focus control optics are coupled to two actuators within the enclosure responsive to electrical signals to remotely adjust both of the first lateral extent and the second lateral extent of the beam of light.

21. The optical system of claim 20, wherein the electrical signals selectively define a first state in which the beam of light has a first selectable lateral extent at a first beam location and a second state in which the beam of light has a second selectable lateral extent at the first beam location different from the first selectable lateral extent, the electrical signals automatically establishing the first state or the second state in response to control signals.

22. The optical system of claim 16, wherein the focus control optics are coupled to a second actuator responsive to electrical signals to adjust the an overall focus position of the beam of light.

23. The optical system of claim 22, wherein the electrical signals selectively define a first state in which the beam of light has a first selectable lateral extent at a first beam location and a second state in which the beam of light has a second selectable lateral extent at the first beam location different from the first selectable lateral extent, the electrical signals automatically establishing either of the first state or the second state in response to control signals.

24. The optical system of claim 22, wherein the focus control optics are coupled to a second actuator responsive to the electrical signals, the second actuator adjusting both of the first focusing position and the second focusing position of the beam of light substantially equally.

25. The optical system of claim 24, wherein the electrical signals selectively define a first state in which the beam of light has a first selectable lateral extent at a first beam location and a second state in which the beam of light has a second selectable lateral extent at the first beam location different from the first selectable lateral extent, the electrical signals automatically establishing either of the first state or the second state in response to control signals.

26. The optical system of claim 16, wherein the focus control optics comprise a lens mounted on a pivot and a linear translation stage, a first actuator coupled to rotate the lens on the pivot and a second actuator coupled to translate the lens along the linear translation stage, the first and second actuator responsive to electrical signals.

27. The optical system of claim 26, wherein the lens is a negative lens.

28. The optical system of claim 26, wherein the electrical signals selectively define a first state in which the beam of light as a first selectable lateral extent at a first beam location and a second state in which the beam of light has a second selectable lateral extent at the first beam location different from the first selectable lateral extent, the electrical signals automatically establishing either of the first state or the second state in response to control signals.

29. The optical system of claim 28, further comprising an enclosure around the spot size control optics, the focus control optics and the first and second actuators, the control signals generated outside of the enclosure.

30. The optical system of claim 29, further comprising a solid state laser within the enclosure, the solid state laser out cutting the beam of light.

31. An optical system, comprising:
   spot size control optics receiving a beam of light, adjusting a lateral extent of the beam of light and outputting the beam of light, the beam of light having a first extent in a first lateral direction and a second extent in a second lateral direction perpendicular to the first lateral direction, the spot size control optics coupled to a spot size actuator and responsive to electrical signals to adjust an ellipticity of the beam, wherein movement of the spot size actuator alters the first lateral extent of the beam of light more than the second lateral extent; and
   focus control optics coupled to a focus actuator responsive to electrical signals, the focus control optics receiving the beam of light, altering a position of a focus of the beam of light and outputting the beam of light, the beam of light having a first focus position for a first lateral component of the beam of light and having a second focus position for second lateral component of the beam of light, the first lateral component perpendicular to the second lateral component, the focus control optics adjusting the first focus position to a greater extent than the second focus position in response to the electrical signals supplied to the focus actuator.

32. The optical system of claim 31, further comprising an enclosure around the spot size control optics and the focus control optics, the enclosure having walls opaque to the beam of light and having at least an output port to output the beam of light.

33. The optical system of claim 32, wherein the spot size control optics are coupled to a first actuator responsive to electrical signals to adjust the first lateral extent of the beam of light and wherein the focus control optics are coupled to a second actuator responsive to the electrical signals to adjust the first focus position.

34. The optical system of claim 32, wherein the spot size control optics are coupled to a first actuator responsive to electrical signals to adjust the first lateral extent of the beam of light without adjusting the second lateral extent of the beam of light and wherein the focus control optics are coupled to a second actuator responsive to electrical signals to adjust the first focus position of the beam of light without adjusting the second focus position of the beam of light.

35. The optical system of claim 32, wherein the spot size control optics are coupled to a first actuator within the enclosure responsive to electrical signals to remotely adjust the first lateral extent of the beam of light and wherein the focus control optics are coupled to a second actuator within the enclosure responsive to electrical signals to remotely adjust the first focus position.

36. The optical system of claim 35, wherein the electrical signals selectively define a first state in which the beam of light has a first selectable lateral extent at a first beam location and a second state in which the beam of light has a second selectable lateral extent at the first beam location different from the first selectable lateral extent, the electrical signals automatically establishing the first state or the second state in response to control signals.

37. The optical system of claim 31, wherein the spot size control optics are coupled to a first actuator responsive to electrical signals to adjust the first lateral extent of the beam of light and wherein the focus control optics are coupled to a second actuator responsive to electrical signals to adjust the first focus position of the beam of light.

38. The optical system of claim 37, wherein the electrical signals selectively define a first state in which the beam of light has a first selectable lateral extent at a first beam location and a second state in which the beam of light has a second selectable lateral extent at the first beam location different from the first selectable lateral extent, the electric signals automatically establishing either of the first state or the second state in response to control signals.

39. The optical system of claim 38, wherein the spot size control optics are coupled to a third actuator responsive to the electrical signals, the third actuator adjusting both of the first lateral extent and the second lateral extent of the beam of light and wherein the focus control optics are coupled to a fourth actuator responsive to the electrical signals, the fourth actuator adjusting both of the first focusing position and the second focusing position of the beam of light.

40. The optical system of claim 39, wherein the electrical signals selectively define a first state in which the beam of light has a first selectable lateral extent at a first beam location and a second state in which the beam of light has a second selectable lateral extent at the first beam location different from the first selectable lateral extent, the electric signals automatically establishing either of the first state or the second state in response to control signals.

41. The optical system of claim 31, wherein the spot size control optics comprise a first lens mounted on a pivot and a linear translation stage, a first actuator coupled to rotate the first lens on the pivot and a second actuator coupled to translate the first lens along the linear translation stage, the first and second actuator responsive to electrical signals, and
  wherein the focus control optics comprise a second lens mounted on a pivot and a linear translation stage, a third a actuator coupled to rotate the second lens on the pivot and a fourth actuator coupled to translate the second lens along the linear translation stage, the third and fourth actuators responsive to electrical signals.

42. The optical system of claim 41, wherein the first lens is a positive lens and the second lens is a negative lens.

43. The optical system of claim 41, wherein the electrical signals selectively define a first state in which the beam of light as a first selectable lateral extent at a first beam location and a second ate in which the beam of light has a second selectable lateral extent at the fist beam location different from the first selectable lateral extent, the electrical signals automatically establishing either of the first state or the second state in response to control signals.

44. The optical system of claim 43, further comprising an enclosure around the spot size control optics, the focus control optics and the first, second, third and fourth actuators, the control signals generated outside of the enclosure.

45. The optical system of claim 44, further comprising a solid state laser within the enclosure, the solid state laser out outputting the beam of light.

46. An optical system, comprising:
  a laser system including a solid state laser, the laser system outputting a beam of light;
  spot size control optics receiving the beam of light, adjusting a lateral extent of the beam of light and outputting the beam of light, the spot size control optics including a first lens mounted on a pivot and a linear translation stage, a first actuator coupled to rotate the first lens on the pivot and a second actuator coupled to translate the lens along the linear translation stage, the first and second actuator responsive to electrical signals;
  focus control optics receiving the beam of light adjusted by the spot size control optics, the focus control optics altering a position of a focus of the beam of light and outputting the beam of light; and
  beam positioning optics receiving the beam of light altered by the focus control optics, the beam positioning optics laterally positioning the beam of light.

47. The optical system of claim 46, wherein the beam positioning optics scan the beam of light in an x and y direction on a receiving surface.

48. The optical system of claim 47, wherein the first lens is a positive lens.

49. The optical system of claim 48, wherein the laser system, the spot size control optics and the focus control optics are within an enclosure.

50. The optical system of claim 49, wherein the electrical signals selectively define a first state in which the beam of light has a first selectable lateral extent at the receiving surface and a second state in which the beam of light has a second selectable lateral extent at the receiving surface different from the first selectable lateral extent, the electrical signals automatically establishing either of the first state or the second state in response to control signals.

51. The optical system of claim 46, wherein the focus control optics comprise a second lens mounted on a pivot and a linear translation stage, a third actuator coupled to rotate the second lens on the pivot and a fourth actuator coupled to translate the second lens along the linear translation stage, the third and fourth actuators responsive to electrical signals.

52. The optical system of claim 51, further comprising an enclosure around the spot size control optics, the focus control optics and the first, second, third and fourth actuators, the control signals generated outside of the enclosure.

53. The optical system of claim 51, wherein the beam positioning optics scan the beam of light in an x and y direction on a receiving surface.

54. The optical system of claim 53, wherein the first lens is a positive lens and the second lens is a negative lens.

55. The optical system of claim 53 wherein the laser system, the spot size control optics and the focus control optics are within an enclosure.

56. The optical system of claim 55 wherein the electrical signals selectively define a first state in which the beam of light as a first selectable lateral extent at the receiving surface and a second state in which the beam of light has a second selectable lateral extent at the receiving surface different from the first selectable lateral extent, the electrical signals automatically establishing either of the first state or the second state in response to control signals.

57. An optical system, comprising:

a laser system including a solid state laser, the laser system outputting a beam of light;

spot size control optics receiving the beam of light, adjusting a lateral extent of the beam of light and outputting the beam of light;

focus control optics receiving the beam of light adjusted by the spot size control optics, the focus control optics altering a position of a focus of the beam of light and outputting the beam of light, the focus control optics comprising a first lens mounted on a pivot and a linear translation stage, a first actuator coupled to rotate the first lens on the pivot an a second actuator coupled to translate the first lens along the linear translation stage, the first and second actuators responsive to electrical signals; and beam positioning optics receiving the beam of light altered by the focus control optics, the beam positioning optics laterally positioning the beam of light.

58. The optical system of claim 57, wherein the beam positioning optics scan the beam of light in an x and y direction on a receiving surface.

59. The optical system of claim 58, wherein the first lens is a negative lens.

60. The optical system of claim 58, wherein the laser system, the spot size control optics and the focus control optics are within an enclosure.

61. The optical system of claim 60, wherein the electrical signals selectively define a first state in which the beam of light has a first selectable lateral extent at the receiving surface and a second state in which the beam of light has a second selectable lateral extent at the receiving surface different from the first selectable lateral extent, the electrical signals automatically establishing either of the first state or the second state in response to control signals.

* * * * *

UNITED STATES PATENT AND TRADEMARK OFFICE
CERTIFICATE OF CORRECTION

PATENT NO. : 6,426,840 B1
DATED : July 30, 2002
INVENTOR(S) : Jouni P. Partanen, Nansheng Tang and Xingkun Wu It is certified that error appears in the above-identified patent and that said Letters Patent is hereby corrected as shown below:

Column 12,
Line 13, "wherein he" should read -- wherein the --.
Line 16, "a second late" should read -- a second state --.
Line 18, "the electric" should read -- the electrical --.
Line 42, "through center" should read -- through a center --.
Line 45, "light as a first" should read -- light has a first --.
Line 47, "extent at the state" should read -- extent at the first --.
Line 48, "the electric" should read -- the electrical --.
Line 54, "outside the" should read -- outside of the --.
Lines 56-57, "laser out outputting" should read -- laser outputting --.

Column 13,
Line 57, "the electrical" should read -- the electric --.

Column 14,
Line 3, "light as a first" should read -- light has a first --.
Lines 14-15, "laser out cutting" should read -- laser outputting --.
Line 33, "position for second" should read -- position for a second --.

Column 15,
Line 35, "the electric" should read -- the electrical --.
Line 46, "third a actuator" should read -- third actuator --.
Line 54, "light as a first" should read -- light has a first --.
Line 55, "a second ate in which" should read -- a second state in which --.
Lines 66-67, "laser out outputting" should read -- laser outputting --.

Column 16,
Line 62, "light as a first" should read -- light has a first --.

UNITED STATES PATENT AND TRADEMARK OFFICE
CERTIFICATE OF CORRECTION

PATENT NO.   : 6,426,840 B1
DATED        : July 30, 2002
INVENTOR(S)  : Jouni P. Partanen, Nansheng Tang and Xingkun Wu It is certified that error appears in the above-identified patent and that said Letters Patent is hereby corrected as shown below:

<u>Column 17,</u>
Line 14, "pivot an a second" should read -- pivot and a second --.

Signed and Sealed this

Tenth Day of December, 2002

JAMES E. ROGAN
*Director of the United States Patent and Trademark Office*